Inventor
Leonard C. Smith
By
Attorney

May 5, 1953   L. C. SMITH   2,637,842
REMOTELY CONTROLLED AND INDICATING PROBE ACTUATION
Filed Oct. 13, 1949   5 Sheets-Sheet 2
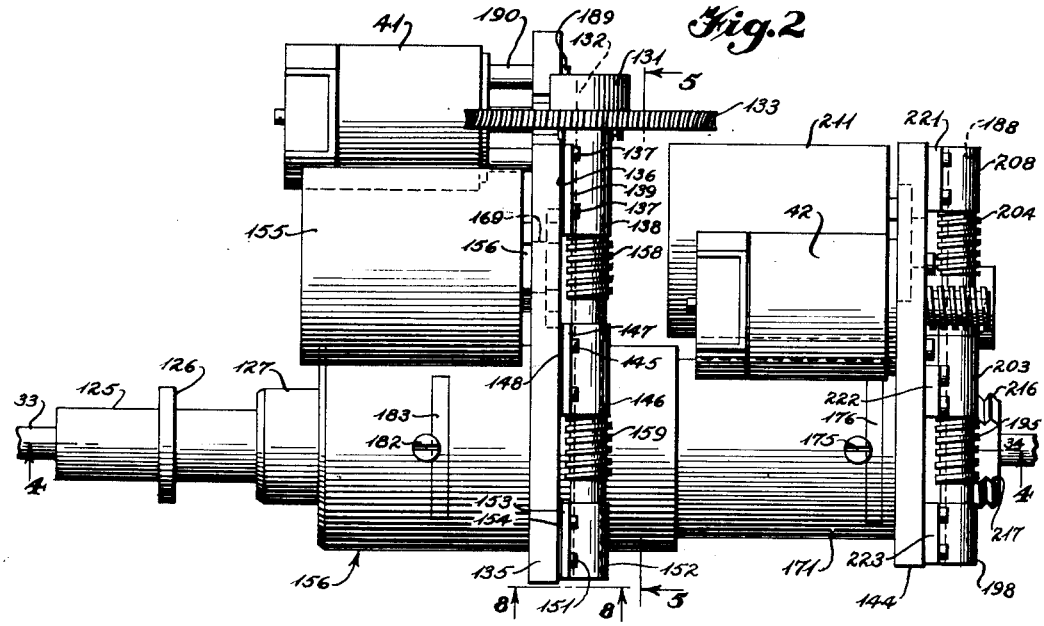
Fig.2
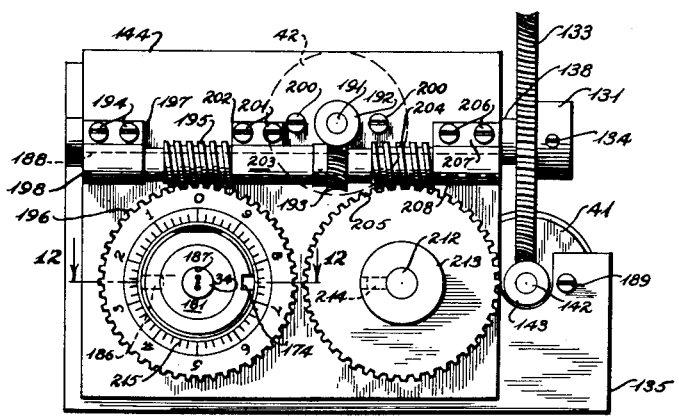
Fig.3
Fig.8
Inventor
Leonard C. Smith
By
Attorney May 5, 1953 L. C. SMITH 2,637,842
REMOTELY CONTROLLED AND INDICATING PROBE ACTUATION
Filed Oct. 13, 1949 5 Sheets-Sheet 3
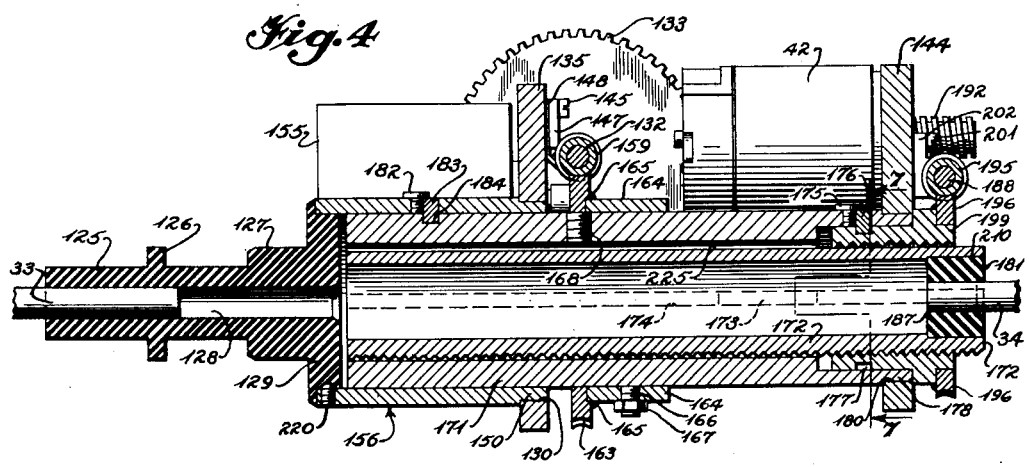
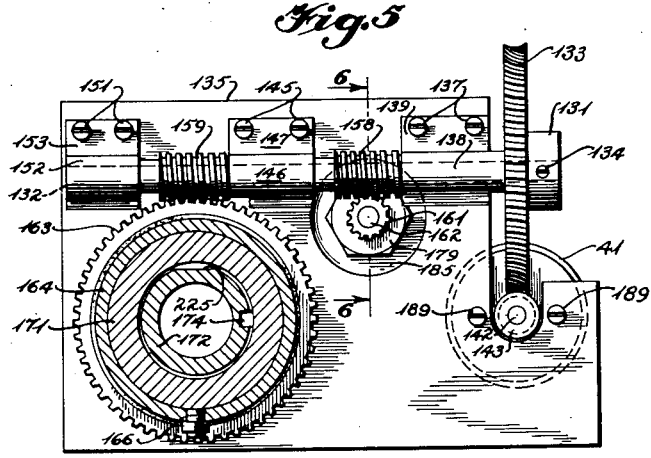
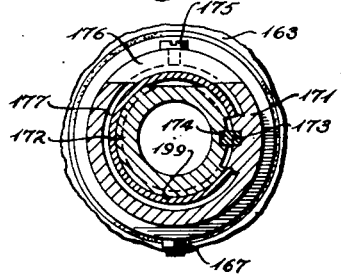
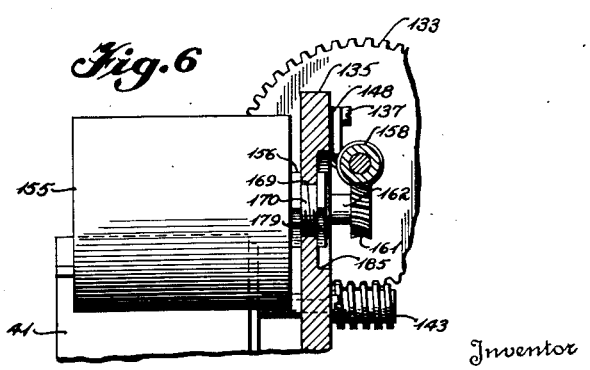
Inventor
Leonard C. Smith
Attorney May 5, 1953  L. C. SMITH  2,637,842
REMOTELY CONTROLLED AND INDICATING PROBE ACTUATION
Filed Oct. 13, 1949  5 Sheets-Sheet 4

Inventor
Leonard C. Smith
By
Attorney

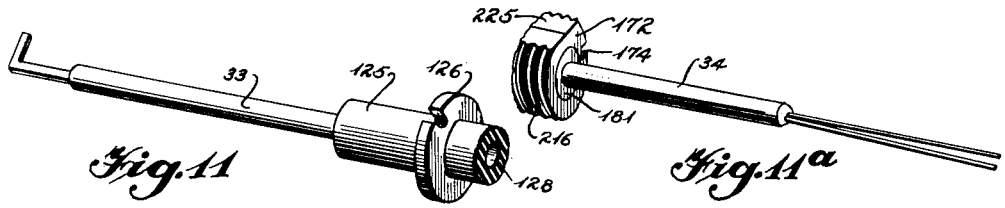
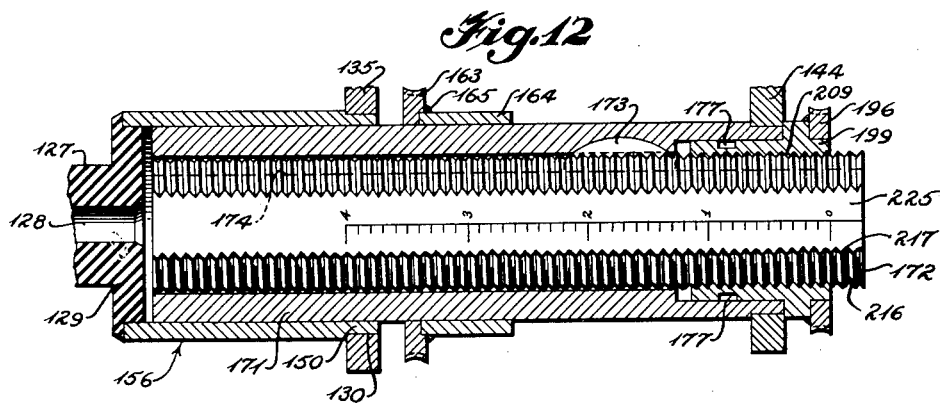
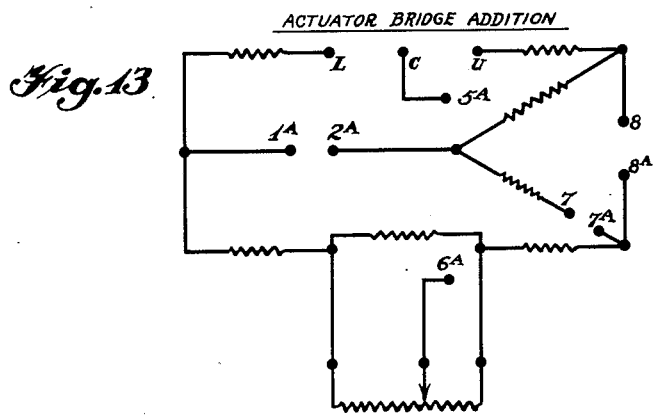
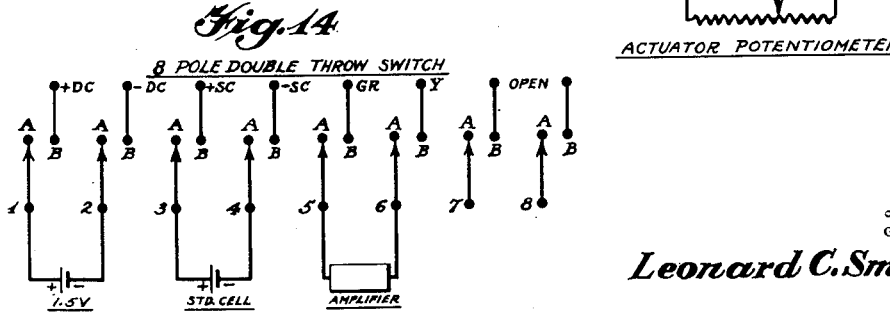

Patented May 5, 1953

2,637,842

UNITED STATES PATENT OFFICE 2,637,842

REMOTELY CONTROLLED AND INDICATING PROBE ACTUATION

Leonard C. Smith, Berea, Ohio

Application October 13, 1949, Serial No. 121,083

5 Claims. (Cl. 340—226)

(Granted under Title 35, U. S. Code (1952), sec. 266)

This invention relates to improvements in testing apparatus, and more particularly to improvements in probing devices.

Prior art devices for and methods of testing apparatus by means of test probes have usually required manual control by an operator located at the equipment to be tested. Such a procedure is time consuming, inefficient, and inaccurate, and may be dangerous to personnel when high speed machinery such as rotating compressors or turbines are being tested.

The apparatus of the instant invention overcomes these disadvantages. The probe may be located at a place remote from the operator, and moved under the control of the operator. Electrical indicating apparatus is provided for indicating the instant position of the probe. A number of remotely located probes may be controlled from a central point, and one indicator used for selectively indicating the instant positions of the probes.

Accordingly, it is an object of this invention to provide new and improved probe apparatus.

Another object is to provide new and improved probe apparatus which may be remotely controlled.

Another object is to provide new and improved probe apparatus having means associated with the probe for indicating the instant position of the probe.

Still another object is to provide new and improved probe apparatus in which a plurality of movable probes are employed.

A further object is to provide new and improved probe apparatus in which a single indicator is employed to selectively indicate the instant positions of a plurality of movable probes.

Still a further object is to provide new and improved probe apparatus in which a remote position indicator is employed in conjunction with a calibrated position indicator at the probe to thereby insure the accuracy of the remote indication.

Other objects and advantages will become apparent after a perusal of the following specification taken in connection with the accompanying drawings, in which:

Fig. 2 is a plan view of the probe actuator;

Fig. 3 is an end elevational view of the probe actuator of Fig. 2;

Fig. 4 is a cross sectional view along the line 4—4 of Fig. 2;

Fig. 5 is a cross sectional view along the line 5—5 of Fig. 2;

Fig. 6 is a detail view partly in section taken along the line 6—6 of Fig. 5;

Fig. 7 is a cross sectional view taken along the line 7—7 of Fig. 4;

Fig. 8 is a detail view from the line 8—8 of Fig. 2 and in which is shown a spring mounted bearing for a drive shaft;

Figs. 11 and 11a are detail views of probes which may be employed in the instant invention;

Fig. 12 is a detail view of a scale for indicating the position of one of the probes; and Figs. 13 and 14 are schematic diagrams of a modification of the electrical circuit of Fig. 1.

Figure 1:
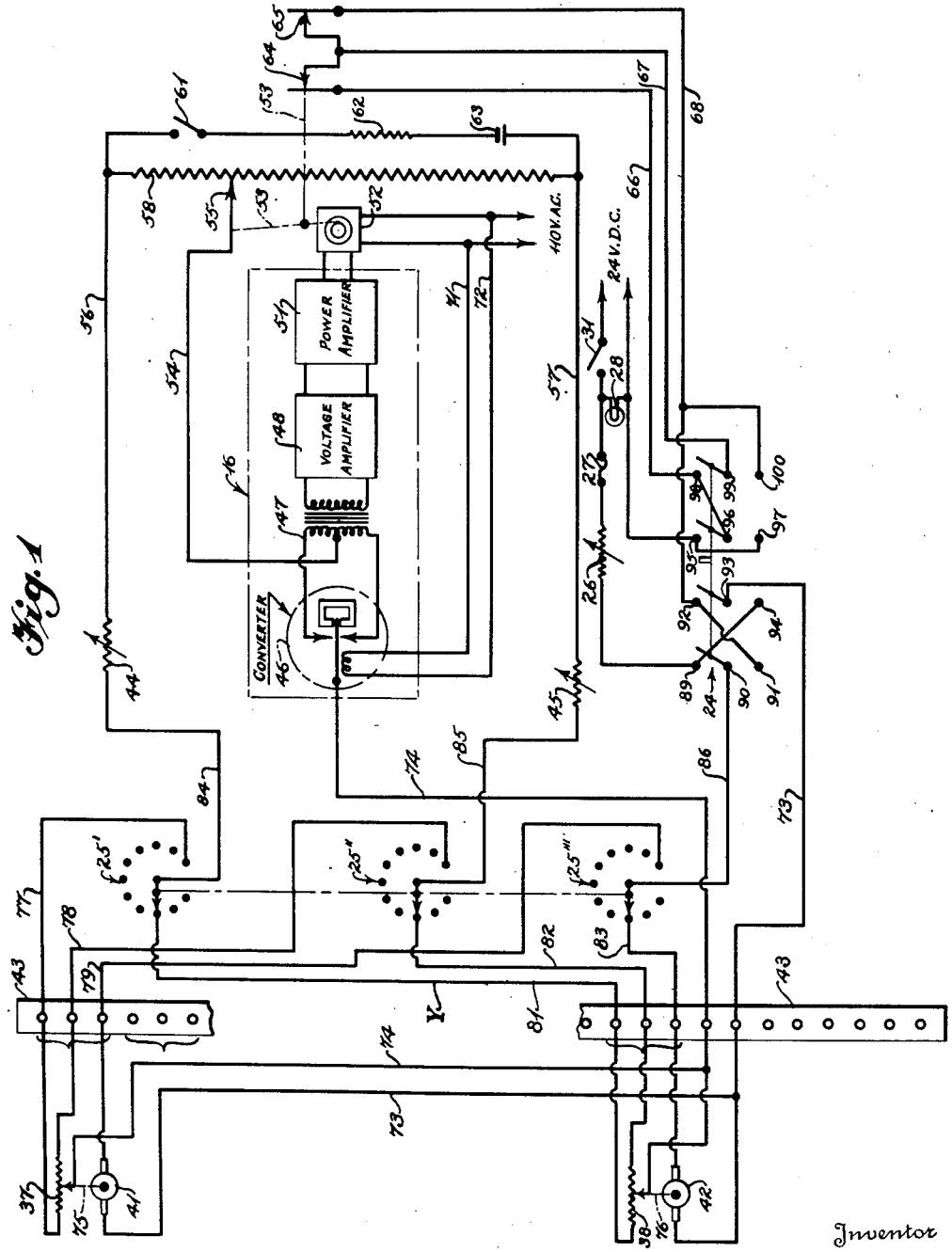
Fig. 1 is a schematic electrical diagram of the control and indicating circuits of the invention.

Referring now to the drawings for a more complete understanding of the invention, and more particularly to Fig. 2 thereof, there is shown a normally vertically disposed supporting plate 135, upon which a motor 41 and potentiometer housing 155 are mounted, the motor being attached to the plate by supporting posts 190 and screws 189. The shaft 142 of motor 41 has secured thereto to rotate therewith a worm 143 which meshes with gear 133, which has the hub 131 thereof secured by set screw 134 to a shaft 132, which extends through the bearing members 138, 146, and 152, and which may have integral therewith the worm gear portions 158 and 159.

The aforementioned potentiometer housing 155, within which is mounted a potentiometer 37 hereinafter to be more fully described, has a threaded neck portion, upon which is the mounting nut 156 adjacent member 155. The neck portion extends through aperture 169 in plate 135, and has threaded thereon the nut 179, which holds the housing 155 securely to plate 135. Nut 179 preferably rests within a recessed portion 185 in plate 135. The control shaft 162 of potentiometer 37, which controls the movable contact thereof, extends through the housing neck and has secured thereto the gear 161 which meshes with the aforementioned worm 158, thereby providing an arrangement in which the arm of potentiometer 37 has a setting corresponding to the setting of shaft 132, for reasons to be subsequently more clearly apparent.

The bearings for shaft 132 comprise the aforementioned support members 138, 146, and 152, which are spring supported, Fig. 8, by springs 136, 148, and 154 respectively, and have mounting members 139, 147, and 153 respectively attached to plate 135 by screws 137, 145, and 151 respectively.

The plate 144 is preferably mounted and maintained substantially parallel to plate 135, and a bottom support, not shown, may be provided for this purpose if desired. Plate 144 has mounted thereon, as by screws 200, a motor 42 which may be similar to the aforementioned motor 41, and which has the motor shaft 191 thereof extending through an aperture in plate 144, and to which is secured to rotate therewith the gear 192.

Gear 192 meshes with a gear 193 secured to shaft 188 to rotate therewith. Shaft 188 also has fixedly mounted thereon to rotate therewith, or integral therewith, a pair of worm gears 195 and 204. The shaft 188 is supported in three bearings 198, 203, and 208, Fig. 3, the bearings being secured to plate 144 by support portions 223, 222, and 221 respectively having screws 194, 201, and 206 respectively.

The aforementioned worm 204 meshes with gear 205 which has the hub 213 thereof secured by set screw 214 to shaft 212 to rotate therewith. Shaft 212 extends through an aperture in plate 144 and into the potentiometer housing 211 which houses the potentiometer 38, the housing 211 being secured to plate 144 in the manner shown.

The aforementioned worm 195 meshes with gear 196, which is secured or welded to collar 199, Fig. 4. Collar 199 has the internal threads shown at 209, Fig. 12. Cylindrical or sleeve member 172, which is positioned within member 199, is threaded throughout its length except for a narrow flat strip 225, upon which is marked a longitudinally extending scale, Fig. 12. The member 172 is prevented from rotating by key 173 in keyway 174 therein. Accordingly, as gear 196 is rotated, member 172 is caused to move longitudinally within member 199.

Mounted or secured within the enlarged bore end portion 210 is a member or bushing 181, preferably of insulating material, secured therein by set screw 186 and having an aperture 187 for receiving one end of the probe 34, Fig. 4. The gear 196 has a scale 215 on the outer face thereof, Fig. 3.

Particular reference is made now to Figs. 4 and 5, in which are shown in cross section details of the mechanism which links plates 135 and 144 and which may be relied upon, if desired, to maintain the plates in substantially parallel positions. Gear 163 meshing with worm 159 is secured or welded at 165 to sleeve 164, which is secured to cylindrical member 171 to rotate therewith by set screw 166 and lock nut 167. Screw 168 may be provided as shown for adjustment purposes. Member 171 has a shaped right end portion, as shown, and set screw 175 holds key 176 in keyway 177 thereby preventing relative longitudinal movement of members 171 and 199 with respect to each other, but permitting rotary movement with respect to each other.

The plate 144 has an aperture 180 therein, which provides a bearing for indented or cut away portion 178 of member 171.

The aforementioned member 171, which rotates with gear 163, has secured thereto to rotate therewith by key 183 in key hole 184 and lock screw 182 the sleeve member 156, which has an indented end portion 150 which rotates in the bearing provided by the aperture 130 in plate 135. Secured to member 156 to rotate therewith by set screw 220 is an end portion or plug 129, preferably composed of insulating material, and having shoulder 127, flange 126, neck 125, and aperture or bore 128 therein for receiving probe 33.

The operation of the aforedescribed mechanism will be readily understood by those skilled in the art. Motor 41, by way of gears 143, 133, 159, and 163 positions the member 125 and probe 33 attached thereto. Gear 158 and gear 161 control the arm of potentiometer 37 in accordance with the rotary setting of probe 33. The mechanical coupling for accomplishing this is shown in Fig. 1 and generally designated by the reference numeral 75, it being understood that the aforementioned gear trains are included within the coupling 75. Likewise motor 42 by way of gears 192 and 193, and gears 195 and 196, causes probe 34 to move longitudinally with respect to plate 144. The gears 204 and 205 provide for positioning the arm of potentiometer 38, these gear trains being included in the coupling 76, Fig. 1.

Figure 9:
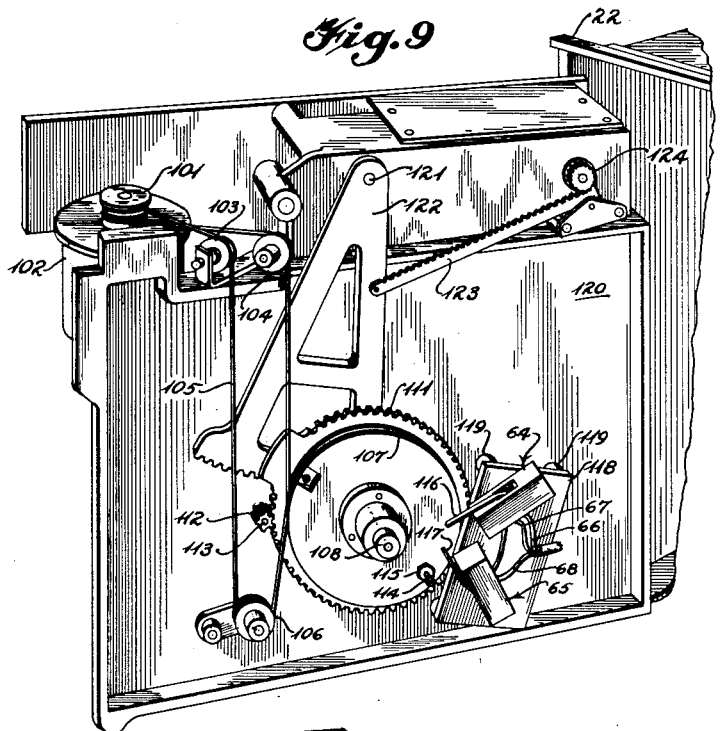
Fig. 9 is a rear elevational view of a suitable indicator instrument.
Figure 10:
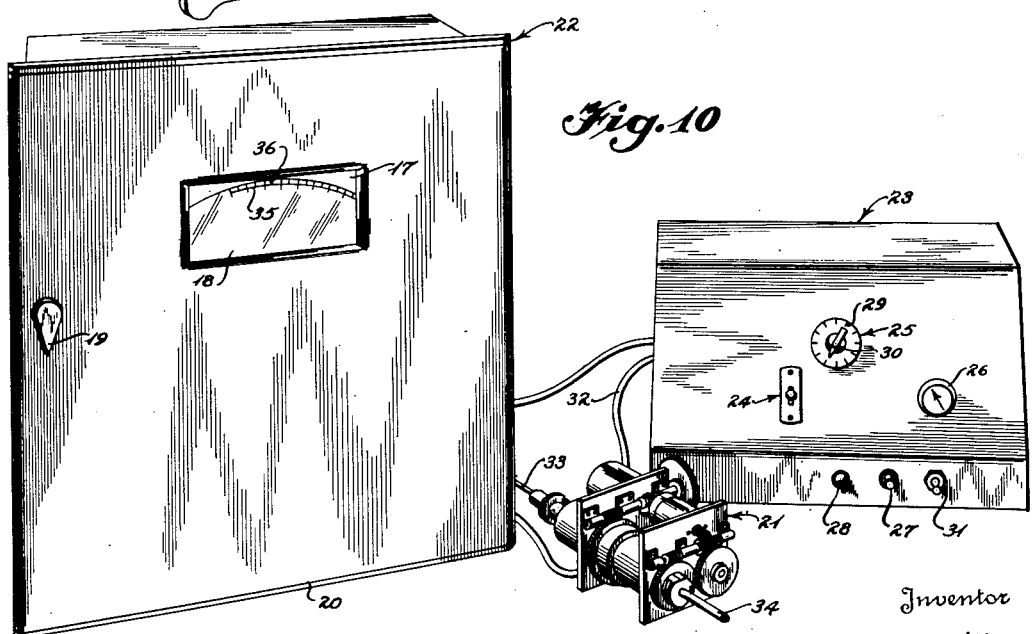
Fig. 10 is a perspective view of the probe actuator and a suitable indicator and control unit.

Particular reference is made now to Figs. 1, 9, and 10, in which the electrical measuring, indicating, and control apparatus is shown. As previously mentioned, the instant invention contemplates the use of a plurality of probe actuators in conjunction with a single measuring instrument adapted to selectively indicate the instant positions or settings of the probes. To this end, a multiple terminal arrangement, such for example as the terminal strip 43, Fig. 1, may be provided, or one or more multiple plugs and jacks may be employed if desired. The circuit of Fig. 1 provides for eleven probes, selectively connected into the measuring circuit by the eleven position, three pole switch generally designated by the reference numeral 25, Fig. 10, having the control knob 30 and setting indicator 29, and having the three sections 25', 25", and 25''', Fig. 1. Both ends of each potentiometer are connected to switch terminals, as shown, and one end of each motor is connected to a switch terminal. One end of potentiometer 37 is connected by way of lead 77 to the eleventh terminal of section 25'; the other end of potentiometer 37 is connected by way of lead 78 to the eleventh terminal of switch section 25". The arm of potentiometer 37 is connected by way of lead 74, which may be common to all the potentiometer arms, to a converter 46, presently to be more fully described. One terminal of the motor 41 is connected by way of lead 79 to the eleventh terminal of switch section 25''', while the other terminal of motor 41 is connected by way of lead 73, which may be common to all the motors, to switch terminal 93 of a four pole double throw switch 24 hereinafter to be more fully described.

In a manner similar to potentiometer 37 and motor 41, the potentiometer 38 and associated motor 42 are connected to switch sections 25', 25", and 25''', and to converter 46 and switch 24, by leads 81, 82, 74, 83, and 73. It will be understood that the circuit arrangement provides for the use of nine additional motors and potentiometers, not shown.

The arm of switch section 25' is connected by way of lead 84 to one terminal of variable resistor 44, which has the other terminal thereof connected by way of lead 56 to one terminal of slide wire potentiometer 58; the arm of switch section 25" is connected by way of lead 85 to one terminal of rheostat 45, and the other terminal of rheostat 45 is connected by way of lead 57 to the other terminal of slide wire potentiometer 58. Across the terminals of potentiometer 58 are connected, in series in the order named, switch 61, resistor 62, and battery or other source of potential 63.

At 16 is shown a converter and amplifier which may be of conventional design and commercially available, such for example as that of model 156X15 Potentiometer Indicator of the Brown Instrument Company. The lead 74 which is common to the arms of the aforementioned potentiometers 37 and 38 is connected to the converter 46, as shown. The center tap of the primary of the transformer 47, to which the output of converter 46 is applied, is connected by way of lead 54 to the arm 55 of potentiometer 58, and which is operatively connected by coupling 53 to motor 52 to be positioned by the rotation of the motor, in a manner to be more fully described.

The secondary of the aforementioned transformer 47 supplies an input to voltage amplifier 48, which supplies an output to power amplifier 51, which in turn supplies an output to drive motor 52, which is also energized by 110 volts A.-C. from leads 71 and 72. The amplifier 16 and motor 52 provide a phase sensitive arrangement, as will be readily understood by those skilled in the art, whereby motor 52 and arm 55 are rotated and moved in two directions selectively in accordance with the polarity of the potential difference existing between lead 74 and arm 55.

As aforementioned, one of the objects of the invention is to provide remotely controlled probe actuators, and to this end the aforementioned probe positioning motors 41 and 42 are provided. These are controlled from the aforementioned four pole three position switch, generally designated 24. The arm of switch section 25''' is connected by way of lead 85 to switch terminal 90. Terminals 89 and 94 are connected by way of variable resistor 26, fuse 27, and switch 31 to one terminal of a 24 volt D.-C. source of potential. The other terminal of the 24 volt source is connected to switch terminals 96 and 97, while across the leads to the 24 volt source is connected the lamp 28, to be illuminated when switch 31 is closed. Terminal 93 is connected to lead 73 as aforementioned. Terminals 91, 92, and 100 are connected by way of lead 68 to a switch 65, such as one known in the trade as a Microswitch, which is mounted upon plate 118 in the manner shown, Fig. 10, and is provided for purposes to be hereinafter more clearly apparent.

A second switch 64 is provided upon plate 118, and has the lead 67 common with switch 65, and connected to terminal 99. Switch 64 is also connected by way of lead 66 to terminal 88 of switch 24.

Particular reference is made now to Figs. 9 and 10, in which is shown in detail the manner in which the aforementioned Brown Instrument Company potentiometer is adapted for use in the instant invention. The front plate 20 of meter 22 has a catch 19 and window 17, with pointer 36, cooperating with scale 35 upon circular card 18.

Mounted within the housing, Fig. 9, and not shown in this view, is the aforementioned balancing motor 52, having shaft 113 extending through back plate 120, the pinion 112 being secured to shaft 113 to rotate therewith. Pinion 112 meshes with the teeth of the gear 111, which has pulley 107 secured thereto to rotate therewith. The pulley 107 has mounted therein the screw 114 having lock nut 115, screw 114 being provided, as shown, upon rotation of pulley 107, to selectively engage the arms 116 and 117 of switches 64 and 65 respectively, thereby to operate the switches, the plate 118 upon which the switches are mounted being secured to back cover 120 by supports 119.

Pulley 107 has in the groove therein the cord or other suitable belt 105, which also runs in the guide pulleys 106, 103, and 104, and is wrapped around the spindle 101 as shown. It is understood that the balancing slide wire potentiometer 58 is located within the housing 102, Fig. 9, and has the arm 55 thereof operatively connected to spindle 101 to rotate therewith, the aforedescribed pulley arrangement providing for a slide wire of maximum length, and accordingly a balance of increased sensitivity.

The scale card 18 may be secured to a plate, not shown, which is secured to the shaft 108 of pulley 107, to rotate with the shaft, pulley and gear 111.

In the operation of the aforedescribed portion of the circuit, a difference of potential between lead 74, or the arm of whichever of the potentiometers 37 and 38 is connected into the circuit, and arm 55, causes energization of the motor 52 to drive pinion 113, pulley 107, cord 105, spindle 101, and arm 55 in a direction until the voltages are balanced. Scale 35, which moves in conjunction with the arm 55, may be calibrated to selectively indicate the voltages on potentiometers 37 and 38, or, if desired, the actual positions of the probes operatively connected thereto, in manners which will be obvious to those skilled in the art.

The members of the Brown Instrument Company potentiometer designated 122, 121, 123, and 124, Fig. 9, are not required for use with the instant invention.

The rheostats 44 and 45 are provided for balancing and zero adjustments purposes. Switch 24 provides for reversing the current through the motors 41 and 42, thereby to provide for reversing their directions of rotation, while rheostat 26 provides for controlling the speed of the motors. Switches 64 and 65 are limit switches for opening the circuits to the motors when the pulley 107 has rotated through an allowable limit in either direction.

The scale of the aforementioned Brown Instrument Company potentiometer is normally calibrated in temperature; in some applications, where the probe apparatus of the instant invention is employed in testing apparatus in which the temperature is an important test condition, it may be desired to use the Brown instrument for temperature measurement as well as probe actuation. This may be accomplished by a suitable switch arrangement such for example as that shown in Figs. 13 and 14. Contacts L. C, and U, Fig. 13, may be connected parallel to the lower, center, and upper contacts respectively of the aforementioned slide wire potentiometer. The other contacts of the circuit of Fig. 13 are connected to the correspondingly designated points of the circuit of Fig. 14, the connection and operation of this circuit being readily understood by those skilled in the art. Throwing the 8 pole switch shown permits the indicator to selectively read temperature or probe position.

It will be understood that suitable lead connections may be provided to the probes 33 and 34 if desired.

Obviously many modifications and variations of the present invention are possible in the light of the above teachings. It is therefore to be understood that within the scope of the appended claims the invention may be practiced otherwise than as specifically described.

This invention may be manufactured and used by or for the Government of the United States of America for governmental purposes without the payment of any royalties thereon or therefor.

What is claimed as new and desired to be secured by Letters Patent is:

1. In apparatus of the character disclosed, in combination, a frame member, a probe apparatus comprising a first probe support, said first probe support being rotatably mounted in said frame member, first motor means, means coupling said first motor means to said first probe support for rotating said first probe support upon the rotation of said first motor means, a first potentiometer having a movable arm, said movable arm being operatively connected to said coupling means and positioned in accordance with the angular position of said first probe support, a second probe support rotatably mounted in said frame member, second motor means, means coupling said second motor means to said second probe support for rotating said second probe support upon the rotation of said second motor means, a second potentiometer having a movable arm, said last named arm being operatively connected to said last named coupling means and positioned in accordance with the setting of said second probe support, electrical circuit means including energizing means and switching means operatively connected to said first and second motor means, and additional electrical circuit means including indicating means operatively connected to said first and second potentiometers for utilizing the voltages at the arms of said potentiometers for selectively indicating the settings of said first and second probe supports, said first and second probe supports being so disposed that angular and axial probing motions are provided with respect to an axis common to said first and second probe supports.

2. In probe apparatus of the character disclosed, in combination, frame means including a pair of parallel upright supporting plates, a probe assembly including first probe coupling means rotatably mounted in a first plate of said pair, motor means mounted upon said first plate and operatively connected to said first probe coupling means for rotating the same, first potentiometer means operatively connected to said first probe coupling means for obtaining a first voltage corresponding to the instant rotary position thereof, said probe assembly also including second probe coupling means mounted upon the second plate of said pair and constructed and arranged to be moved laterally with respect to said plate, additional motor means operatively connected to said second coupling means for moving the latter, second potentiometer means operatively connected to said second probe coupling means for obtaining a second voltage corresponding to the instant lateral position thereof, and indicating means selectively responsive to said first and second voltages to provide indications of the instant settings of the first and second probe coupling means respectively.

3. In probe apparatus of the character disclosed, in combination, frame means including a pair of parallel upright supporting plates, a probe assembly including first probe coupling means rotatably mounted in a first plate of said pair, motor means mounted upon said first plate and operatively connected to said probe coupling means for rotating the same, a first potentiometer connected to said first probe coupling means for obtaining a first voltage corresponding to the instant rotary position thereof, said probe assembly also including second probe coupling means mounted upon the second plate of said pair and constructed and arranged to be moved laterally with respect to said plate, additional motor means operatively connected to said second coupling means for moving the latter, second potentiometer means operatively connected to said second probe coupling means for obtaining a second voltage corresponding to the instant lateral position thereof, and indicating means selectively responsive to said first and second voltages.

4. In probe apparatus of the character disclosed, in combination, a first plate member, first worm gear means mounted upon said first plate member, first motor means operatively connected to said first worm gear means for rotating the same, first potentiometer means having a movable arm coupled to and driven by said first worm gear means, probe means constructed and arranged to have a first portion movable angularly with respect to an axis normal to the plane of said first plate member and a second portion movable axially, means coupling said first portion to said first worm gear means, a second plate member disposed substantially parallel to said first plate member, second worm gear means mounted upon said second plate member, second motor means operatively connected to said second worm gear means for rotating the same, second potentiometer means having a movable arm coupled to and driven by said second worm gear means, means coupling said second portion of the probe means to said second worm gear means, and electrical circuit means including indicating means operatively connected to said first and second potentiometer means for utilizing the voltages at the arms of said potentiometer means for selectively indicating the settings of the first and second portions of the probe means.

5. Apparatus according to claim 4 including additional electric circuit means having therein energizing means and switching means operatively connected to said first and second motor means.

LEONARD C. SMITH.

References Cited in the file of this patent

UNITED STATES PATENTS

| Number | Name | Date |
|---|---|---|
| 877,312 | Evershed | Jan. 21, 1908 |
| 1,376,633 | Obermaier | May 3, 1921 |
| 1,699,759 | Shepherd | Jan. 22, 1929 |
| 1,795,650 | Hershey | Mar. 10, 1931 |
| 1,985,007 | Ashworth | Dec. 18, 1934 |
| 2,018,364 | Jansen | Oct. 22, 1934 |
| 2,473,682 | Harris et al. | June 21, 1949 |